(12) United States Patent
Toko

(10) Patent No.: US 10,577,017 B2
(45) Date of Patent: Mar. 3, 2020

(54) STEERING CONTROL APPARATUS

(71) Applicant: JTEKT CORPORATION, Osaka-shi, Osaka (JP)

(72) Inventor: Takahiro Toko, Takahama (JP)

(73) Assignee: JTEKT CORPORATION, Osaka (JP)

(*) Notice: Subject to any disclaimer, the term of this patent is extended or adjusted under 35 U.S.C. 154(b) by 50 days.

(21) Appl. No.: 15/848,975

(22) Filed: Dec. 20, 2017

(65) Prior Publication Data

US 2018/0178835 A1   Jun. 28, 2018

(30) Foreign Application Priority Data

Dec. 27, 2016 (JP) ................................ 2016-254201

(51) Int. Cl.
*B62D 5/04*   (2006.01)

(52) U.S. Cl.
CPC ......... *B62D 5/0484* (2013.01); *B62D 5/0463* (2013.01); *B62D 5/0481* (2013.01); *B62D 5/0487* (2013.01); *B62D 5/0493* (2013.01)

(58) Field of Classification Search
CPC .. B62D 5/0484; B62D 5/0463; B62D 5/0481; B62D 5/0487; B62D 5/0493
USPC ...................................... 180/443, 444, 446
See application file for complete search history.

(56) References Cited

U.S. PATENT DOCUMENTS

| 5,987,365 A | * | 11/1999 | Okamoto | ............. | F02D 41/266 |
| | | | | | 701/34.3 |
| 8,935,037 B2 | | 1/2015 | Bechtler et al. | | |

| 2004/0243287 A1 | | 12/2004 | Yanaka et al. | | |
| 2013/0261894 A1 | | 10/2013 | Kojima | | |
| 2013/0342148 A1 | * | 12/2013 | Yanai | .................. | B62D 5/0487 |
| | | | | | 318/472 |

(Continued)

FOREIGN PATENT DOCUMENTS

| JP | 2007-153001 A | | 6/2007 |
| JP | 2007153001 A | * | 6/2007 |
| WO | 01/72571 A2 | | 10/2001 |

OTHER PUBLICATIONS

May 11, 2018 Extended European Search Report issued in European Patent Application No. 17210013.3.

(Continued)

*Primary Examiner* — Jacob D Knutson
(74) *Attorney, Agent, or Firm* — Oliff PLC

(57) ABSTRACT

A steering ECU includes a plurality of microcomputers to control a motor. A main communication line for communicating a main command value and a subsidiary communication line for communicating a subsidiary command value are connected to each of the microcomputers. The steering ECU includes an abnormality detecting circuit configured to detect a normal state, a semi-normal state detected during the normal state, or an abnormal state detected during the semi-normal state as a communication state of each communication line. When the normal state is detected for the main communication line, the abnormality detecting circuit is configured to set use of the main command value. When the semi-normal state or the abnormal state is detected for the main communication line, the abnormality detecting circuit is configured to set use of the subsidiary command value under a condition that the normal state is detected for the subsidiary communication line.

3 Claims, 10 Drawing Sheets

(56) References Cited

U.S. PATENT DOCUMENTS

| | | | |
|---|---|---|---|
| 2015/0226627 A1* | 8/2015 | Kuwahara | B62D 5/049 |
| | | | 701/41 |
| 2016/0164662 A1* | 6/2016 | Kang | B60L 58/21 |
| | | | 375/356 |
| 2016/0325738 A1* | 11/2016 | Miyazaki | B60L 58/15 |
| 2016/0332660 A1 | 11/2016 | Sasaki et al. | |
| 2019/0047492 A1* | 2/2019 | Yamanaka | B62D 5/04 |

OTHER PUBLICATIONS

May 29, 2018 Extended Search Report issued in European Patent Application No. 17210016.6.
U.S. Appl. No. 15/849,028, filed Dec. 20, 2017 in the name of Toko.
Oct. 4, 2019 Office Action issued in U.S. Appl. No. 15/849,028.

* cited by examiner

| Er < Eth | Er ≥ Eth | Er ≥ Eth: CONTINUE |
|---|---|---|
| NORMAL STATE ⇄ | SEMI-NORMAL STATE → | ABNORMAL STATE |

STEERING CONTROL APPARATUS

INCORPORATION BY REFERENCE

The disclosure of Japanese Patent Application No. 2016-254201 filed on Dec. 27, 2016 including the specification, drawings and abstract, is incorporated herein by reference in its entirety.

BACKGROUND OF THE INVENTION

1. Field of the Invention

The present invention relates to a steering control apparatus.

2. Description of the Related Art

There is provided a steering control apparatus including a control processing circuit configured to control driving of a motor that is a source of power for turning steered wheels of a vehicle so that the power is applied to a steering mechanism (for example, Japanese Patent Application Publication No. 2007-153001 (JP 2007-153001 A)).

JP 2007-153001 A describes a steering control apparatus including a first processing unit configured to compute a motor command value, and a second processing unit configured to control driving of a motor based on the motor command value computed by the first processing unit. Those processing units are connected to each other by two communication lines of an active system and a backup system through which the processing units are communicable with each other. In the two communication lines of the active system and the backup system, the same information is basically transmitted as information for controlling the driving of the motor except for identification information indicating the active system or the backup system. Based on the identification information, the respective processing units use information communicated through the communication line of the active system when controlling the driving of the motor.

In the steering control apparatus described in JP 2007-153001 A, when an abnormality such as interruption of communication is recognized in the communication line of the active system, the content of the identification information is switched, so that the current communication line of the backup system is switched to a communication line of an active system. Thus, even when the abnormality such as interruption of communication is recognized in the communication line of the active system, disruption of communication is prevented between the processing units.

In the steering control apparatus described in JP 2007-153001 A, when the abnormality such as interruption of communication is recognized in the communication line of the active system, the content of the identification information is switched, so that the current communication line of the backup system is switched to a communication line of an active system. In this case, however, the abnormality has already occurred. That is, even when the communication line of the backup system is switched to a communication line of an active system, the respective processing units execute the control under the condition that the abnormality has occurred. Thus, there is a situation in which the power cannot appropriately be applied to the steering mechanism.

SUMMARY OF THE INVENTION

It is one object of the present invention to provide a steering control apparatus capable of reducing the occurrence of a situation in which power cannot appropriately be applied to a steering mechanism.

A steering control apparatus according to one aspect of the present invention includes:

control processing circuits configured to control driving of a motor that is a source of power for turning a steered wheel of a vehicle so that the power is applied to a steering mechanism; and a plurality of communication lines for communicating control information necessary for the control processing circuits to control the driving of the motor, the plurality of communication lines being connected to each of the control processing circuits.

The plurality of communication lines include a main communication line and a subsidiary communication line. The main communication line is used for communicating main control information that is set so as to be mainly used by the control processing circuits as the control information. The subsidiary communication line is used for communicating subsidiary control information that is structured so as to be usable by the control processing circuits as the control information in place of the main control information.

The steering control apparatus further includes an abnormality detecting circuit configured to detect a normal state, a semi-normal state detected during the normal state, or an abnormal state detected during the semi-normal state as a communication state of each of the plurality of communication lines. The normal state is a state in which the control information is communicable. The semi-normal state is a state in which an abnormality occurs but the control information is communicable. The abnormal state is a state in which an abnormality occurs and the control information is not communicable.

When the normal state is detected for the main communication line, the abnormality detecting circuit is configured to set use of the main control information communicated via the main communication line. When the semi-normal state or the abnormal state is detected for the main communication line, the abnormality detecting circuit is configured to set use of the subsidiary control information communicated via the subsidiary communication line under a condition that the normal state is detected for the subsidiary communication line.

In the configuration described above, the use of the main control information communicated via the main communication line having instability in its communication state can be stopped in a stage in which the main communication line is in the semi-normal state before the abnormal state is detected. In this case, detection of the normal state for the subsidiary communication line is set as the condition. Therefore, the control of the driving of the motor can be continued by using the subsidiary control information in place of the main control information. Thus, it is possible to reduce the occurrence of a situation in which the control information communicated via the communication line having instability or abnormality in its communication state is used for the control of the driving of the motor. Accordingly, it is possible to reduce the occurrence of the situation in which the power cannot appropriately be applied to the steering mechanism even in the situation in which the communication state of the main communication line has instability.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
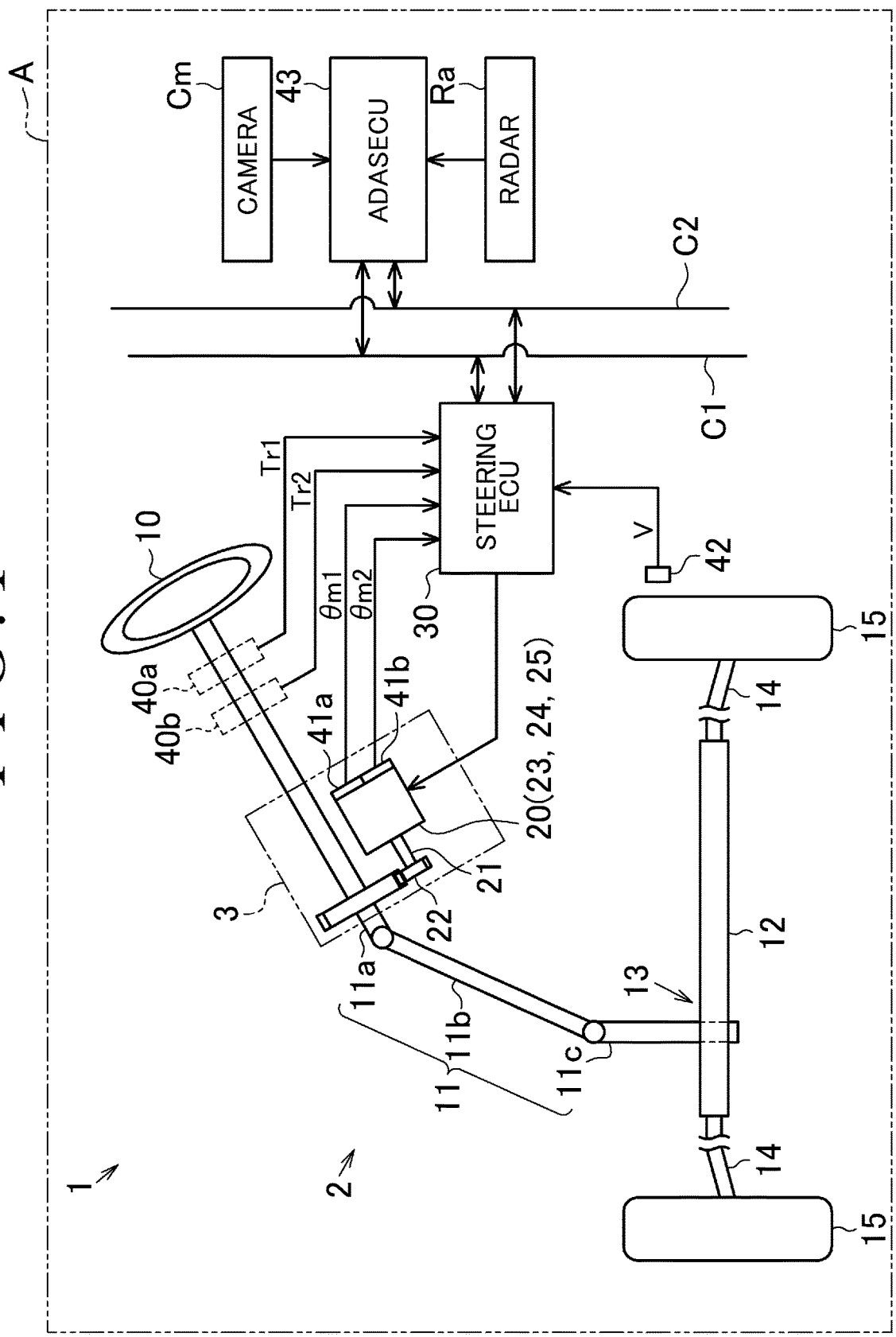
FIG. 1 is a diagram illustrating an overview of an electric power steering system.

A steering control apparatus according to one embodiment of the present invention is described below. As illustrated in FIG. 1, an electric power steering system (automatic steering system) 1 is mounted on a vehicle A. The electric power steering system 1 has a function of advanced driver assistance systems (ADAS), that is, a function of assisting a driver in his/her driving.

The electric power steering system 1 includes a steering mechanism 2 and an actuator 3. The steering mechanism 2 turns steered wheels 15 based on a user's operation for a steering wheel 10. The actuator 3 applies power (assist force) for turning the steered wheels 15 to the steering mechanism 2.

The steering mechanism 2 includes the steering wheel 10 and a steering shaft 11. The steering wheel 10 is operated by the user. The steering shaft 11 is fixed to the steering wheel 10. The steering shaft 11 includes a column shaft 11a, an intermediate shaft 11b, and a pinion shaft 11c. The column shaft 11a is coupled to the steering wheel 10. The intermediate shaft 11b is coupled to the lower end of the column shaft 11a. The pinion shaft 11c is coupled to the lower end of the intermediate shaft 11b. The lower end of the pinion shaft 11c is coupled to a rack shaft 12 via a rack and pinion mechanism 13. Rotational motion of the steering shaft 11 is converted into reciprocating linear motion in an axial direction of the rack shaft 12 via the rack and pinion mechanism 13. The reciprocating linear motion is transmitted to the right and left steered wheels 15 via tie rods 14 coupled to both ends of the rack shaft 12, thereby changing steered angles of the steered wheels 15.

The actuator 3 is provided in the middle of the column shaft 11a fixed to the steering wheel 10. The actuator 3 includes a motor 20 that is a source of the power (assist force) to be applied to the steering mechanism 2. For example, the motor 20 is a surface permanent magnet synchronous motor (SPMSM), and is a three-phase brushless motor configured to rotate based on driving electric power of three phases (U, V, and W). A rotary shaft 21 of the motor 20 is coupled to the column shaft 11a via a speed reducing mechanism 22. The actuator 3 transmits a rotational force of the rotary shaft 21 of the motor 20 to the column shaft 11a via the speed reducing mechanism 22. The torque (rotational force) of the motor 20 that is applied to the column shaft 11a serves as the power to change the steered angles of the right and left steered wheels 15.

Figure 2:
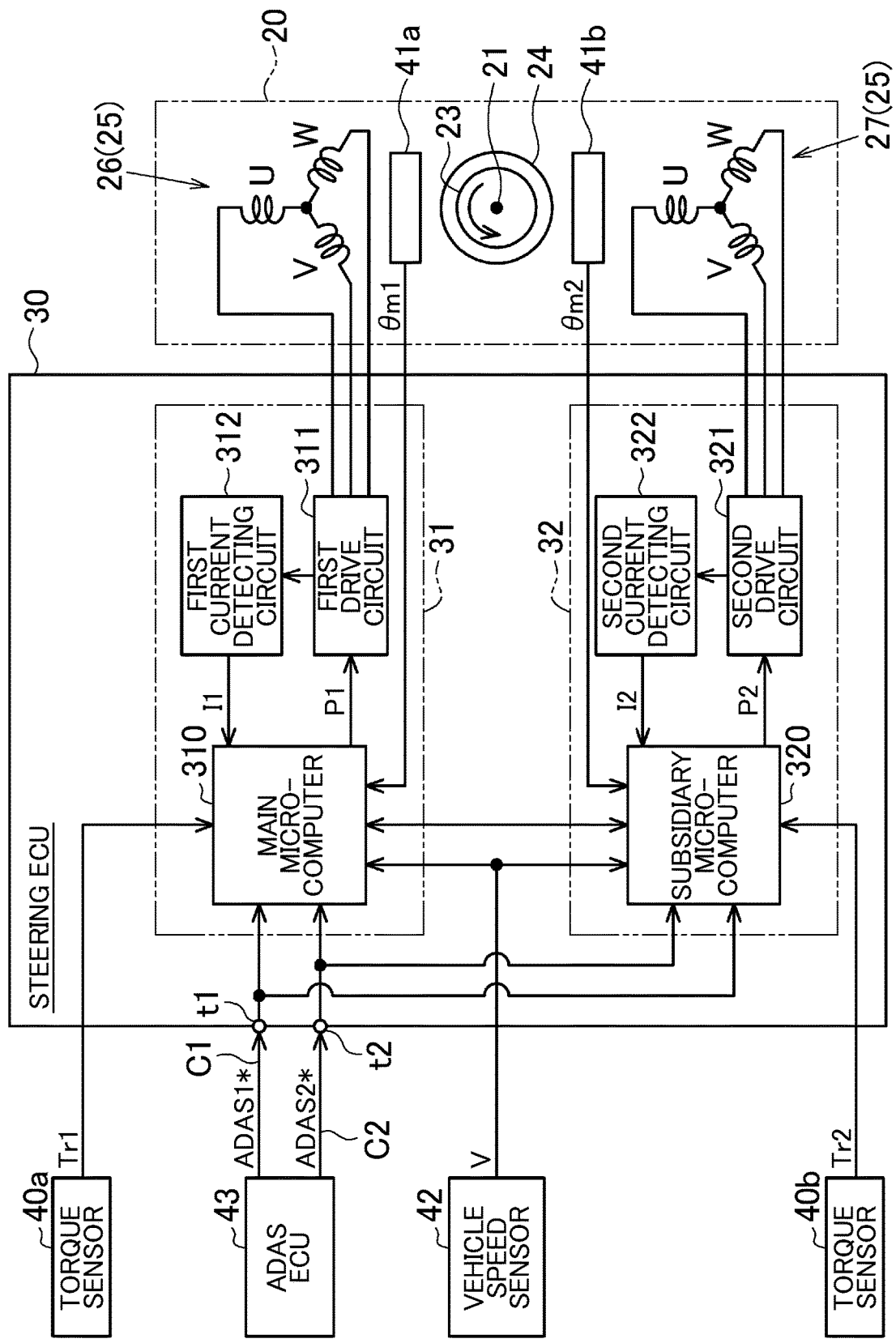
FIG. 2 is a block diagram illustrating the electrical configuration of a steering ECU that implements a steering control apparatus.

As illustrated in FIG. 1 and FIG. 2, the motor 20 includes a rotor 23 and a stator 24. The rotor 23 rotates about the rotary shaft 21 of the motor 20. The stator 24 is arranged on the outer periphery of the rotor 23. Permanent magnets are fixed to the surface of the rotor 23. The permanent magnets are arranged side by side in a circumferential direction of the rotor 23 so that different poles (N pole and S pole) alternate with each other. When the motor 20 rotates, the permanent magnets form magnetic fields. In the stator 24, a plurality of windings 25 of three phases (U phase, V phase, and W phase) are arranged in a circular ring shape. The windings 25 are classified into windings of a first system (hereinafter referred to as "first windings") 26, and windings of a second system (hereinafter referred to as "second windings") 27. Each set of the windings 26 and 27 is formed by star connection. In each set of the windings 26 and 27, the windings of the respective phases are alternately arranged along the circumference of the stator 24 for each system, collectively arranged side by side along the circumference of the stator 24, or arranged at the same teeth while being stacked in a radial direction of the stator 24.

A steering electronic control unit (ECU) 30 is connected to the actuator 3. The steering ECU 30 serves as the steering control apparatus configured to control driving of the motor 20. The steering ECU 30 controls the driving of the motor 20 by controlling supply of a current that is a controlled variable of the motor 20 based on detection results from various sensors provided in the vehicle A. Examples of various sensors include torque sensors 40a and 40b, rotation angle sensors 41a and 41b, and a vehicle speed sensor 42. The torque sensors 40a and 40b are provided on the column shaft 11a. The rotation angle sensors 41a and 41b are provided on the motor 20. The torque sensors 40a and 40b detect steering torques Tr1 and Tr2, respectively, that are generated with changes on the steering shaft 11 through a user's steering operation. The rotation angle sensors 41a and 41b detect rotation angles θm1 and θm2, respectively, of the rotary shaft 21 of the motor 20. The vehicle speed sensor 42 detects a vehicle speed V that is a traveling speed of the vehicle A.

The steering ECU 30 is communicably connected to an on-board ADAS electronic control unit (ECU) 43 via a main communication line C1 and a subsidiary communication line C2 of, for example, a controller area network (CAN; registered trademark), which constitute an on-board network. The steering ECU 30 is communicably connected to the various sensors 40a, 40b, 41a, 41b, and 42 via communication lines for sensors (not illustrated), which constitute the on-board network.

The ADAS ECU 43 instructs the steering ECU 30 to perform driving assistance control for achieving a travel of the vehicle A along a target course that is set, for example, so that the vehicle A travels while keeping its traveling lane or avoiding collisions. The ADAS ECU 43 computes the target course to be used for the driving assistance control based on image data obtained by photographing with an on-board camera Cm and a detection result from an on-board radar Ra. The target course computed by the ADAS ECU 43 is information indicating the course of the vehicle A, which is a direction of the vehicle A relative to a road.

Next, the electrical configuration of the electric power steering system 1 is described.

As illustrated in FIG. 2, the ADAS ECU 43 outputs a main command value ADAS1* to the main communication line C1 in each predetermined period. The main command value ADAS1* is information indicating the target course computed based on the image data obtained by photographing with the on-board camera Cm and the detection result from the on-board radar Ra. The ADAS ECU 43 also outputs a subsidiary command value ADAS2* to the subsidiary communication line C2 in each predetermined period. The subsidiary command value ADAS2* is the same information as the main command value ADAS1*, and is structured so as to be usable in place of the main command value ADAS1*. Each of the command values ADAS1* and ADAS2* is information containing a direction component. In this embodiment, each of the command values ADAS1* and ADAS2* is structured so that a rightward direction with respect to the traveling direction of the vehicle A is indicated by a positive value (+) and a leftward direction with respect to the traveling direction of the vehicle A is indicated by a negative value (−).

The main command value ADAS1* output from the ADAS ECU 43 is input to the steering ECU 30 via a main transceiver t1 connected to a bus terminal of the main communication line C1. The subsidiary command value ADAS2* output from the ADAS ECU 43 is input to the steering ECU 30 via a subsidiary transceiver t2 connected to a bus terminal of the subsidiary communication line C2.

The steering ECU 30 includes a main control system 31 and a subsidiary control system 32. The main control system 31 supplies a current to the first windings 26 of the motor 20. The subsidiary control system 32 supplies a current to the second windings 27 of the motor 20. The main control system 31 includes a main microcomputer 310, a first drive circuit 311, and a first current detecting circuit 312. The main microcomputer 310 generates a pulse width modulation (PWM) signal P1. The first drive circuit 311 supplies a current to the motor 20 based on the PWM signal P1. The first current detecting circuit 312 detects a current value I1 of each phase, which is generated in a power supply path between the first drive circuit 311 and the first windings 26. The subsidiary control system 32 includes a subsidiary microcomputer 320, a second drive circuit 321, and a second current detecting circuit 322. The subsidiary microcomputer 320 generates a PWM signal P2. The second drive circuit 321 supplies a current to the motor 20 based on the PWM signal P2. The second current detecting circuit 322 detects a current value I2 of each phase, which is generated in a power supply path between the second drive circuit 321 and the second windings 27. In this embodiment, the main microcomputer 310 is an example of a first control processing circuit, and the subsidiary microcomputer 320 is an example of a second control processing circuit.

The main microcomputer 310 acquires detection results from the torque sensor 40a, the rotation angle sensor 41a, and the vehicle speed sensor 42, and also acquires a command value from the ADAS ECU 43. Then, the main microcomputer 310 generates the PWM signal P1 based on the detection results and the command value, and outputs the PWM signal P1 to the first drive circuit 311. Similarly, the subsidiary microcomputer 320 acquires detection results from the torque sensor 40b, the rotation angle sensor 41b, and the vehicle speed sensor 42, and also acquires a command value from the ADAS ECU 43. Then, the subsidiary microcomputer 320 generates the PWM signal P2 based on the detection results and the command value, and outputs the PWM signal P2 to the second drive circuit 321.

Specifically, the main microcomputer 310 is connected to the main communication line C1 via the main transceiver t1, and to the subsidiary communication line C2 via the subsidiary transceiver t2. That is, the main microcomputer 310 is configured to acquire the main command value ADAS1* via the main transceiver t1, and to acquire the subsidiary command value ADAS2* via the subsidiary transceiver t2. Similarly, the subsidiary microcomputer 320 is connected to the main communication line C1 via the main transceiver t1, and to the subsidiary communication line C2 via the subsidiary transceiver t2. That is, the subsidiary microcomputer 320 is configured to acquire the main command value ADAS1* via the main transceiver t1, and to acquire the subsidiary command value ADAS2* via the subsidiary transceiver t2. The main microcomputer 310 and the subsidiary microcomputer 320 are configured to communicate necessary information with each other. The microcomputers 310 and 320 share information on, for example, abnormalities of the respective microcomputers and abnormalities of the sensors connected to the respective microcomputers.

Figure 3:
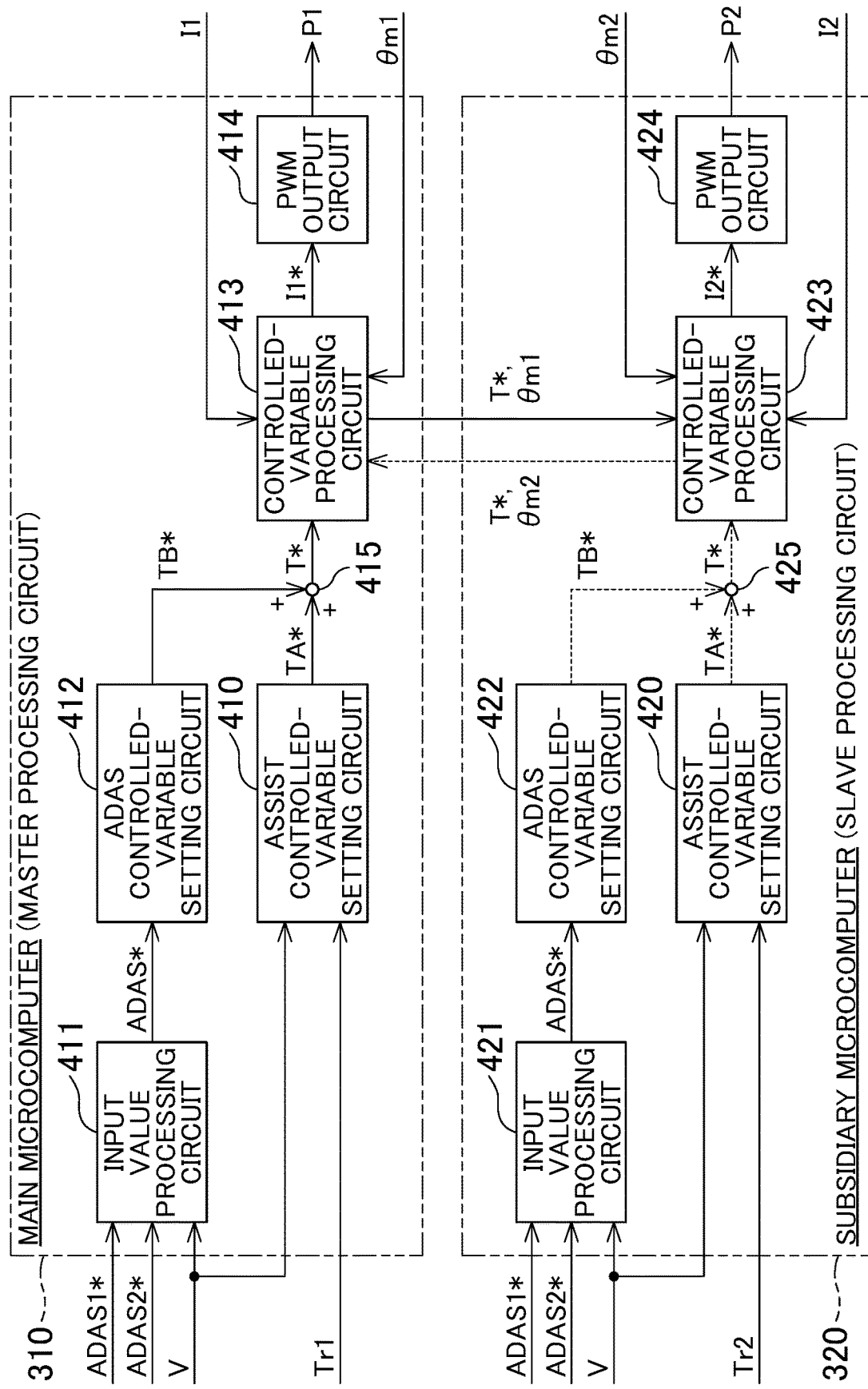
FIG. 3 is a block diagram illustrating functions of microcomputers of the steering ECU.

Next, functions of the microcomputers 310 and 320 of the steering ECU 30 are described in detail. As illustrated in FIG. 3, the main microcomputer 310 includes an assist controlled-variable setting circuit 410, an input value processing circuit 411, an ADAS controlled-variable setting circuit 412, a controlled-variable processing circuit 413, and a PWM output circuit 414. The subsidiary microcomputer 320 includes an assist controlled-variable setting circuit 420 having the same function as that of the assist controlled-variable setting circuit 410, an input value processing circuit 421 having the same function as that of the input value processing circuit 411, an ADAS controlled-variable setting circuit 422 having the same function as that of the ADAS controlled-variable setting circuit 412, a controlled-variable processing circuit 423 having the same function as that of the controlled-variable processing circuit 413, and a PWM output circuit 424 having the same function as that of the PWM output circuit 414. The microcomputers 310 and 320 have the same functions as described above, and therefore the functions of the main microcomputer 310 are mainly described below for convenience.

The steering torque Tr1 and the vehicle speed V are input to the assist controlled-variable setting circuit 410. The assist controlled-variable setting circuit 410 sets and outputs an assist controlled variable TA* based on the steering torque Tr1 and the vehicle speed V. The assist controlled variable TA* is a target value of the current to be generated in the motor 20. The assist controlled variable TA* is a target value of an assist force to be applied in order to assist the user's steering operation, and is a controlled variable for executing electric power steering control.

The vehicle speed V, the main command value ADAS1*, and the subsidiary command value ADAS2* are input to the input value processing circuit 411. The input value processing circuit 411 outputs a driving assistance command value ADAS* to be used for the driving assistance control based on the command value ADAS1* or ADAS2*.

The driving assistance command value ADAS* output from the input value processing circuit 411 is input to the ADAS controlled-variable setting circuit 412. The ADAS controlled-variable setting circuit 412 sets and outputs an ADAS controlled variable TB* based on the driving assistance command value ADAS*. The ADAS controlled variable TB* is a target value of the current to be generated in the motor 20. The ADAS controlled variable TB* is a target value of an assist force for assisting the user's steering operation so that the vehicle A follows the target course computed by the ADAS ECU 43, and is a controlled variable for executing the driving assistance control.

The assist controlled variable TA* output from the assist controlled-variable setting circuit 410 and the ADAS controlled variable TB* output from the ADAS controlled-variable setting circuit 412 are added through an addition processing circuit 415. A value obtained by the addition is input to the controlled-variable processing circuit 413 as an assist torque command value T* that is a final target value of the current. The controlled-variable processing circuit 413 generates the PWM signal P1 based on the assist torque command value T*, the rotation angle θm1 acquired from the rotation angle sensor 41a, and the current value I1 acquired from the first current detecting circuit 312, and outputs the PWM signal P1 to the first drive circuit 311.

In this embodiment, the microcomputers 310 and 320 are basically configured such that the main microcomputer 310 functions as a master processing circuit and the subsidiary microcomputer 320 functions as a slave processing circuit.

As indicated by a continuous line in FIG. 3, the assist torque command value T* computed by the main microcomputer 310 and the rotation angle θm1 input to the main microcomputer 310 are output to the controlled-variable processing circuit 423 of the subsidiary microcomputer 320 through the controlled-variable processing circuit 413. The controlled-variable processing circuit 423 of the subsidiary microcomputer 320 generates the PWM signal P2 based on the assist torque command value T* and the rotation angle θm1 acquired from the main microcomputer 310 and the current value I2 acquired from the second current detecting circuit 322, and outputs the PWM signal P2 to the second drive circuit 321.

As indicated by a dashed line in FIG. 3, the assist controlled-variable setting circuit 420 of the subsidiary microcomputer 320 sets the assist controlled variable TA* similarly to the main microcomputer 310. The input value processing circuit 421 of the subsidiary microcomputer 320 sets the driving assistance command value ADAS*. The ADAS controlled-variable setting circuit 422 of the subsidiary microcomputer 320 sets the ADAS controlled variable TB*. The assist torque command value T* is input to the controlled-variable processing circuit 423 of the subsidiary microcomputer 320.

When a microcomputer abnormality or a sensor abnormality occurs in the main microcomputer 310, the subsidiary microcomputer 320 functions as the master processing circuit in place of the main microcomputer 310, and the main microcomputer 310 functions as the slave processing circuit.

In this case, as indicated by dashed lines in FIG. 3, the controlled-variable processing circuit 423 of the subsidiary microcomputer 320 generates the PWM signal P2 based on the assist torque command value T* that is a value obtained by addition through an addition processing circuit 425, the rotation angle θm2 acquired from the rotation angle sensor 41b, and the current value I2 acquired from the second current detecting circuit 322, and outputs the PWM signal P2 to the second drive circuit 321.

The assist torque command value T* computed by the subsidiary microcomputer 320 and the rotation angle θm2 input to the subsidiary microcomputer 320 are output to the controlled-variable processing circuit 413 of the main microcomputer 310 through the controlled-variable processing circuit 423. The controlled-variable processing circuit 413 of the main microcomputer 310 generates the PWM signal P1 based on the assist torque command value T* and the rotation angle θm2 acquired from the subsidiary microcomputer 320 and the current value I1 acquired from the first current detecting circuit 312, and outputs the PWM signal P1 to the first drive circuit 311. When a microcomputer abnormality or a sensor abnormality occurs in both of the microcomputers 310 and 320, the microcomputers 310 and 320 disable the control of the driving of the motor 20.

Next, the functions of the input value processing circuits 411 and 421 of the microcomputers 310 and 320 are described in more detail. The input value processing circuits 411 and 421 of the microcomputers 310 and 320 have the same functions, and therefore the functions of the input value processing circuit 411 are mainly described below for convenience.

Figure 4:
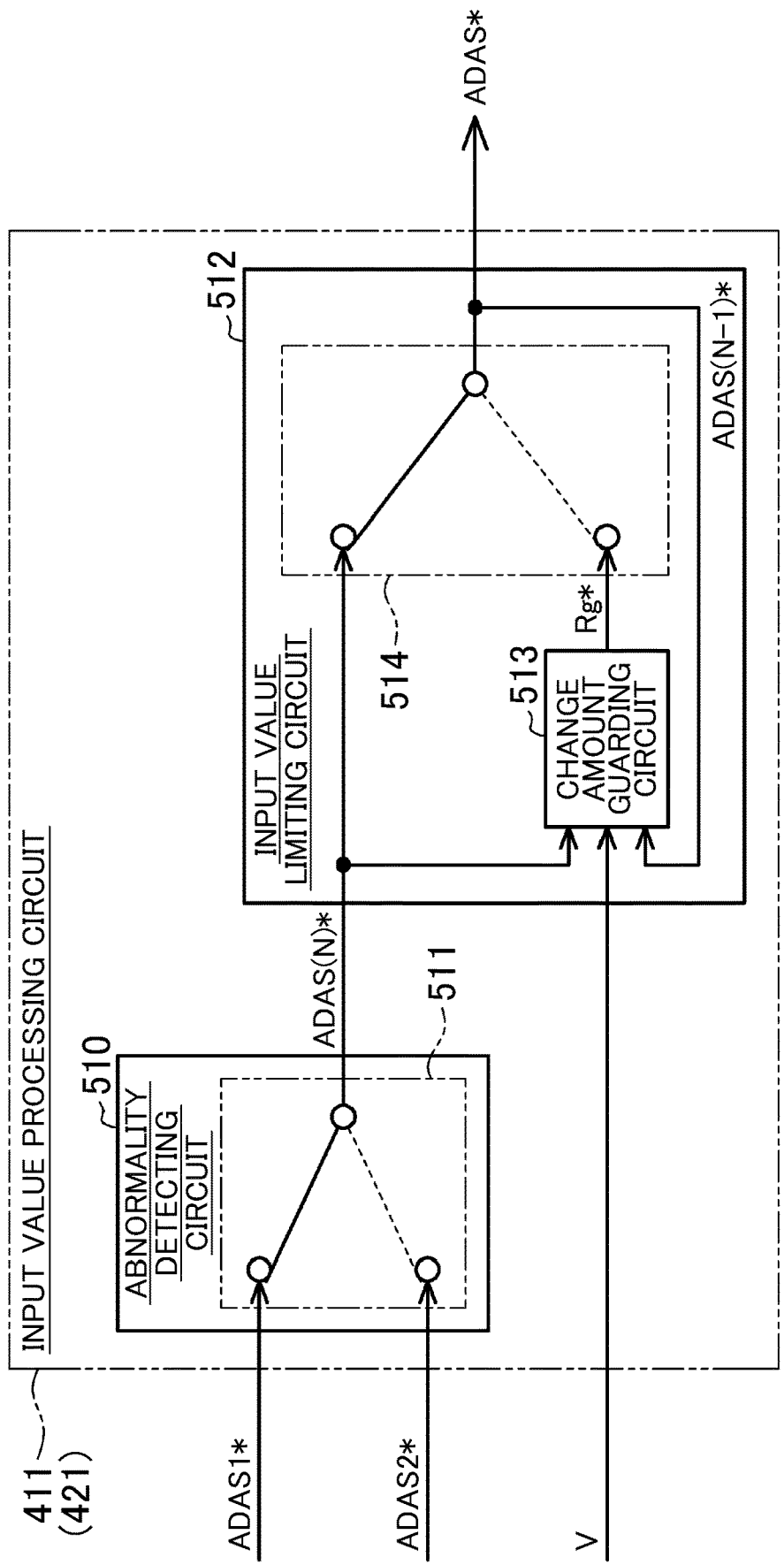
FIG. 4 is a block diagram illustrating functions of an input value processing circuit of each of the microcomputers.

As illustrated in FIG. 4, the input value processing circuit 411 includes an abnormality detecting circuit 510 including a selection switching circuit 511, and an input value limiting circuit 512 including a change amount guarding circuit 513 and an output value switching circuit 514.

In the abnormality detecting circuit 510, the main command value ADAS1* and the subsidiary command value ADAS2* are input to the selection switching circuit 511. The selection switching circuit 511 is configured such that its selection state is controllable to switch between the command values ADAS1* and ADAS2* to be output as a selected command value ADAS(N)*. The selected command value ADAS(N)* is a selected input value to be input to the input value limiting circuit 512 for use in the control of the driving of the motor 20.

The abnormality detecting circuit 510 detects a communication state of the main communication line C1 based on the main command value ADAS1*, and also detects a communication state of the subsidiary communication line C2 based on the subsidiary command value ADAS2*. The abnormality detecting circuit 510 controls the selection state of the selection switching circuit 511 based on the communication states of the communication lines C1 and C2.

Specifically, the abnormality detecting circuit 510 detects a normal state, a semi-normal state, or an abnormal state of the main communication line C1. In the normal state, the main command value ADAS1* is communicable. In the semi-normal state, an abnormality occurs but the main command value ADAS1* is communicable. In the abnormal state, an abnormality occurs and the main command value ADAS1* is not communicable. Those communication states are detected based on a count of failures in the reception of the main command value ADAS1*. The failure in the reception of the main command value ADAS1* corresponds to a case where the main command value ADAS1* cannot be received at an appropriate timing, or a case where the main command value ADAS1* can be received at an appropriate timing but a checksum indicates an abnormality in its value. The failure in the reception of the main command value ADAS1* also corresponds to a case where its absolute value exceeds an upper limit value in design, or a case where the main command value ADAS1* contains information for notifying the user of an abnormality of the ADAS ECU 43 itself. The same applies to the communication state of the subsidiary communication line C2.

Figures 5, 6:
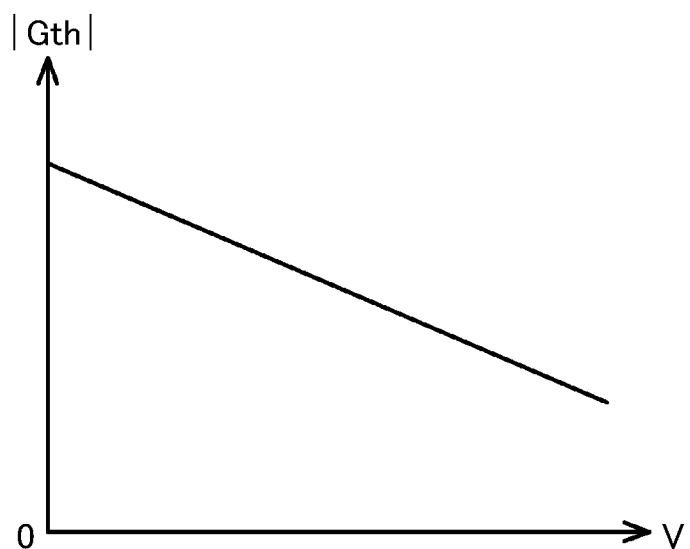
FIG. 5 is a diagram illustrating communication states of a communication line.
FIG. 6 is a diagram illustrating a relationship between a vehicle speed and a limiting threshold.

For example, as illustrated in FIG. 5, the abnormality detecting circuit 510 measures a reception failure count Er that is a count of successive failures in the reception of the main command value ADAS1*. When the reception failure count Er is smaller than a threshold count Eth (Er<Eth), the abnormality detecting circuit 510 detects that the main communication line C1 is in the normal state. For example, the threshold count Eth is two or any other number larger than one. The normal state corresponds to an error active state of the CAN.

When the reception failure count Er is equal to or larger than the threshold count Eth and this state continues for a period of time shorter than a threshold time Tth (Er≥Eth), the abnormality detecting circuit 510 detects that the main communication line C1 is in the semi-normal state. For example, the threshold time Tth is one second or a few seconds. The semi-normal state is detected during the normal state to indicate that the main communication line C1 is not in the abnormal state but an abnormality is detected and therefore the communication state has instability. The semi-normal state corresponds to an error passive state of the CAN. When the reception failure count Er is smaller than the threshold count Eth in the semi-normal state, the main communication line C1 recovers to the normal state.

When the reception failure count Er is equal to or larger than the threshold count Eth and this state continues for a period of time equal to or longer than the threshold time Tth (Er≥Eth: Continue), the abnormality detecting circuit 510 detects that the main communication line C1 is in the abnormal state. The abnormal state is detected during the semi-normal state to indicate confirmation of the detection of an abnormality. The abnormal state corresponds to a bus-off state of the CAN. In the abnormal state, the main communication line C1 cannot recover to the semi-normal state. When a special condition such as a reset of communication is satisfied, the main communication line C1 recovers to the normal state.

When the main communication line C1 is in the normal state, the abnormality detecting circuit 510 controls the selection state of the selection switching circuit 511 so that the main command value ADAS1* is output. That is, when the main communication line C1 is in the normal state, the abnormality detecting circuit 510 is configured to set the use of the main command value ADAS1* irrespective of the communication state of the subsidiary communication line C2. In this embodiment, the main communication line C1 is a communication line that is basically set for use in the driving assistance control. The main command value ADAS1* communicated via the main communication line C1 is main control information that is basically set for use in the driving assistance control.

When the main communication line C1 is in the semi-normal state or the abnormal state, that is, when the main communication line C1 is not in the normal state, the abnormality detecting circuit 510 controls the selection state of the selection switching circuit 511 so that the subsidiary command value ADAS2* is output under a condition that the subsidiary communication line C2 is in the normal state. Thus, when the main communication line C1 is not in the normal state, the abnormality detecting circuit 510 is configured to set the use of the subsidiary command value ADAS2* under the condition that the subsidiary communication line C2 is in the normal state. In this embodiment, the subsidiary communication line C2 is a communication line that is set for use in the driving assistance control as a substitute when the main communication line C1 is not in the normal state and the communication state has instability. The subsidiary command value ADAS2* communicated via the subsidiary communication line C2 is subsidiary control information that is set for use in the driving assistance control as a substitute when the main communication line C1 is not in the normal state and the communication state has instability. When neither the communication line C1 nor C2 is in the normal state, the abnormality detecting circuit 510 performs control so as to maintain the selection state of the selection switching circuit 511 at that time.

In the input value limiting circuit 512, the selected command value ADAS(N)*, the vehicle speed V, and a switched command value ADAS(N−1)* are input to the change amount guarding circuit 513. The switched command value ADAS(N−1)* is the driving assistance command value ADAS* that is used for the driving assistance control last time. The change amount guarding circuit 513 is configured to generate a limiting command value Rg* based on the selected command value ADAS(N)*, the vehicle speed V, and the switched command value ADAS(N−1)*, and to output the limiting command value Rg* to the output value switching circuit 514.

Specifically, the change amount guarding circuit 513 outputs the limiting command value Rg* when the selected command value ADAS(N)* deviates from an allowable range defined in accordance with the vehicle speed V. In this embodiment, the allowable range is based on the switched command value ADAS(N−1)* and is set by a limiting threshold Gth defined in accordance with the vehicle speed V. The allowable range is a range that is equal to or smaller than the absolute value of a value obtained by adding the switched command value ADAS(N−1)* and the limiting threshold Gth. The limiting command value Rg* is a value obtained by adding the switched command value ADAS(N−1)* and the limiting threshold Gth, and is a maximum or minimum value of the allowable range.

As illustrated in FIG. 6, the change amount guarding circuit 513 has a map that defines a relationship between the vehicle speed V and the absolute value of the limiting threshold Gth. In this map, the absolute value of the limiting threshold Gth is set smaller as the vehicle speed V is larger. Each of the selected command value ADAS(N)* and the switched command value ADAS(N−1)* is information containing a direction component similarly to the command values ADAS1* and ADAS2*. The limiting threshold Gth is information containing a direction component, and is basically set as a positive value (+) or a negative value (−) so that the direction component is identical to the direction component of the switched command value ADAS(N−1)*.

For example, when the selection state of the selection switching circuit 511 is switched from the selection state in which the main command value ADAS1* is output as the selected command value ADAS(N)* to the selection state in which the subsidiary command value ADAS2* is output as the selected command value ADAS(N)*, the selected command value ADAS(N)* may deviate unexpectedly so as to change abruptly before and after the switching. The limiting threshold Gth is a value set within a range that is experimentally determined under the assumption that the selected command value ADAS(N)* does not change abruptly before and after the switching of the selection state of the selection switching circuit 511.

In the input value limiting circuit 512, the selected command value ADAS(N)* and the limiting command value Rg* are input to the output value switching circuit 514. The output value switching circuit 514 is configured such that its selection state is controllable to switch between the selected command value ADAS(N)* and the limiting command value Rg* to be output as the driving assistance command value ADAS*.

When the input selected command value ADAS(N)* is a value obtained after the selection state of the selection switching circuit 511 is switched, the input value limiting circuit 512 detects whether the selected command value ADAS(N)* deviates from the allowable range that is set by the change amount guarding circuit 513. The input value limiting circuit 512 controls the selection state of the output value switching circuit 514 based on the input selected command value ADAS(N)*.

Specifically, when the input selected command value ADAS(N)* is not the value obtained after the selection state of the selection switching circuit 511 is switched, the input value limiting circuit 512 controls the selection state of the output value switching circuit 514 so that the selected command value ADAS(N)* is output as the driving assistance command value ADAS*. The same applies to a case where the input selected command value ADAS(N)* is the value obtained after the selection state of the selection switching circuit 511 is switched but does not deviate from the allowable range.

When the input selected command value ADAS(N)* is the value obtained after the selection state of the selection switching circuit 511 is switched and deviates from the allowable range, the input value limiting circuit 512 controls the selection state of the output value switching circuit 514 so that the limiting command value Rg* is output as the driving assistance command value ADAS*.

Figure 7:
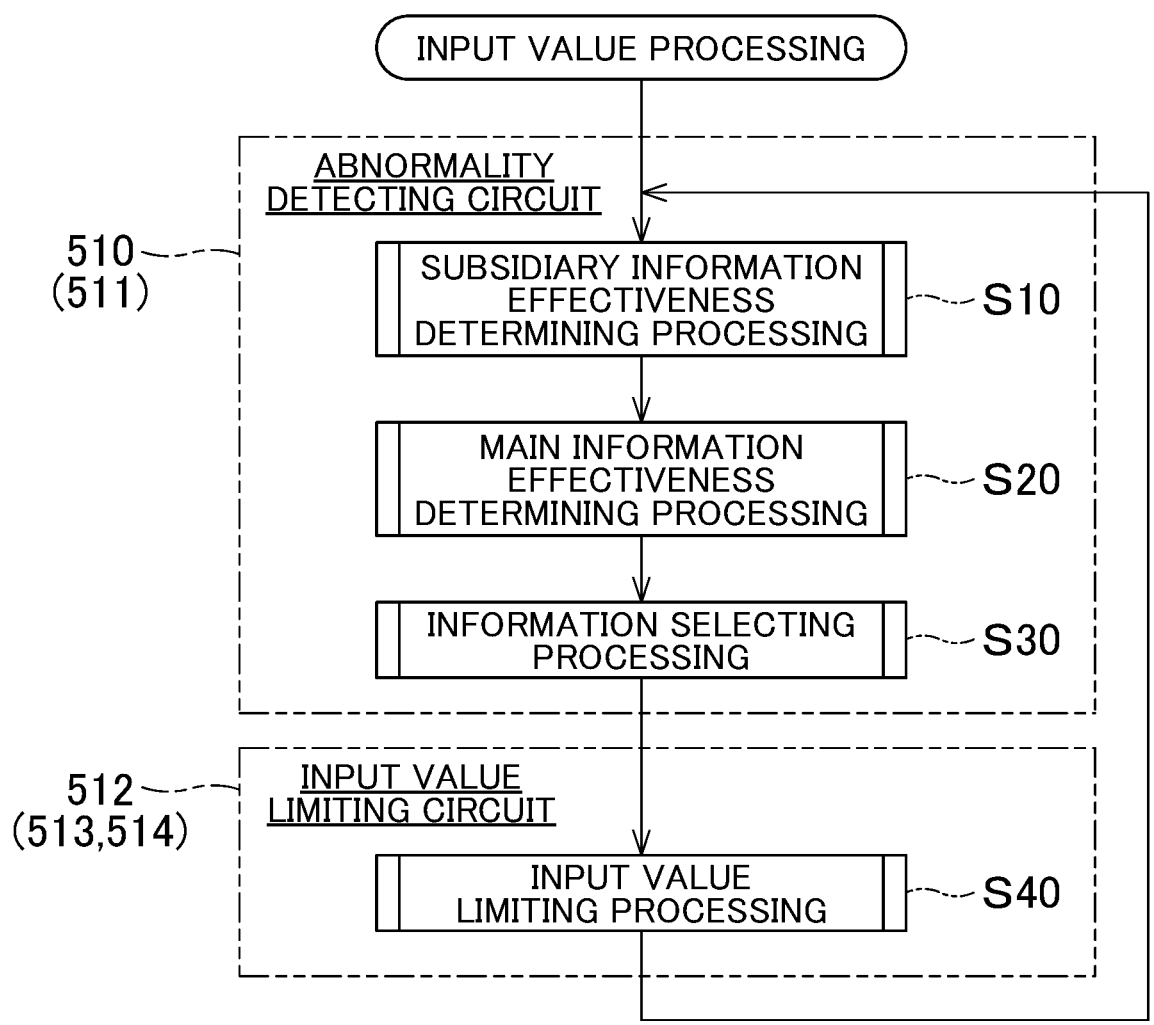
FIG. 7 is a flowchart illustrating input value processing to be executed by each of the microcomputers.

Next, subsidiary information effectiveness determining processing (FIG. 8), main information effectiveness determining processing (FIG. 9), and information selecting processing (FIG. 10) to be executed by the abnormality detecting circuit 510 and input value limiting processing (FIG. 11) to be executed by the input value limiting circuit 512 are described in detail regarding input value processing to be executed by the input value processing circuit 411 in order to output the driving assistance command value ADAS* (FIG. 7). Also in this case, the input value processing circuits 411 and 421 of the microcomputers 310 and 320 have the same functions, and therefore the functions of the input value processing circuit 411 are mainly described below for convenience.

When the driving assistance control is enabled, the input value processing circuit 411 executes the input value processing in each control period of the main microcomputer 310. As illustrated in FIG. 7, the abnormality detecting circuit 510 of the input value processing circuit 411 first executes the subsidiary information effectiveness determining processing (Step S10), the main information effectiveness determining processing (Step S20), and the information selecting processing (Step S30) in this order. Then, the input value limiting circuit 512 of the input value processing circuit 411 executes the input value limiting processing (Step S40), and then the abnormality detecting circuit 510 executes the subsidiary information effectiveness determining processing (Step S10) again.

Figure 8:
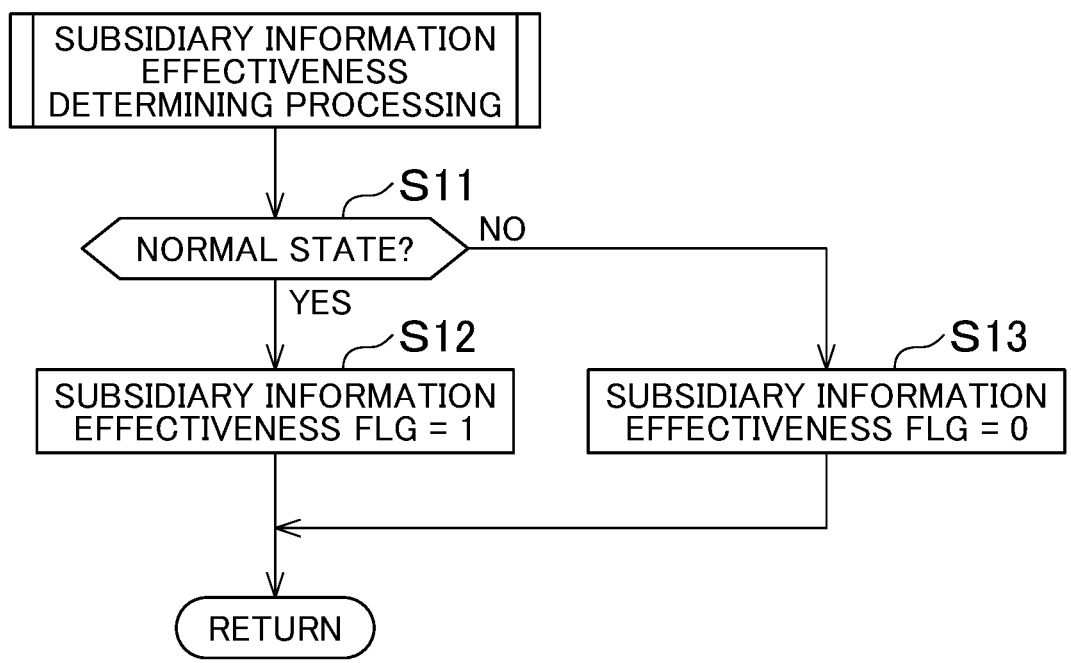
FIG. 8 is a flowchart illustrating subsidiary information effectiveness determining processing in the input value processing.

Specifically, as illustrated in FIG. 8, in the subsidiary information effectiveness determining processing (Step S10), the abnormality detecting circuit 510 determines whether the subsidiary communication line C2 is in the normal state (Step S11). When the subsidiary communication line C2 is in the normal state (Step S11: YES), the abnormality detecting circuit 510 sets "1" to a subsidiary information effectiveness flag (FLG) (Step S12). Then, the abnormality detecting circuit 510 terminates the subsidiary information effectiveness determining processing, and returns to the input value processing. The subsidiary information effectiveness FLG is information indicating the communication state of the subsidiary communication line C2, and is set in a predetermined storage area of the main microcomputer 310.

When the subsidiary communication line C2 is not in the normal state (Step S11: NO), the abnormality detecting circuit 510 sets "0" to the subsidiary information effectiveness FLG (Step S13). Then, the abnormality detecting circuit 510 terminates the subsidiary information effectiveness determining processing, and returns to the input value processing.

Figure 9:
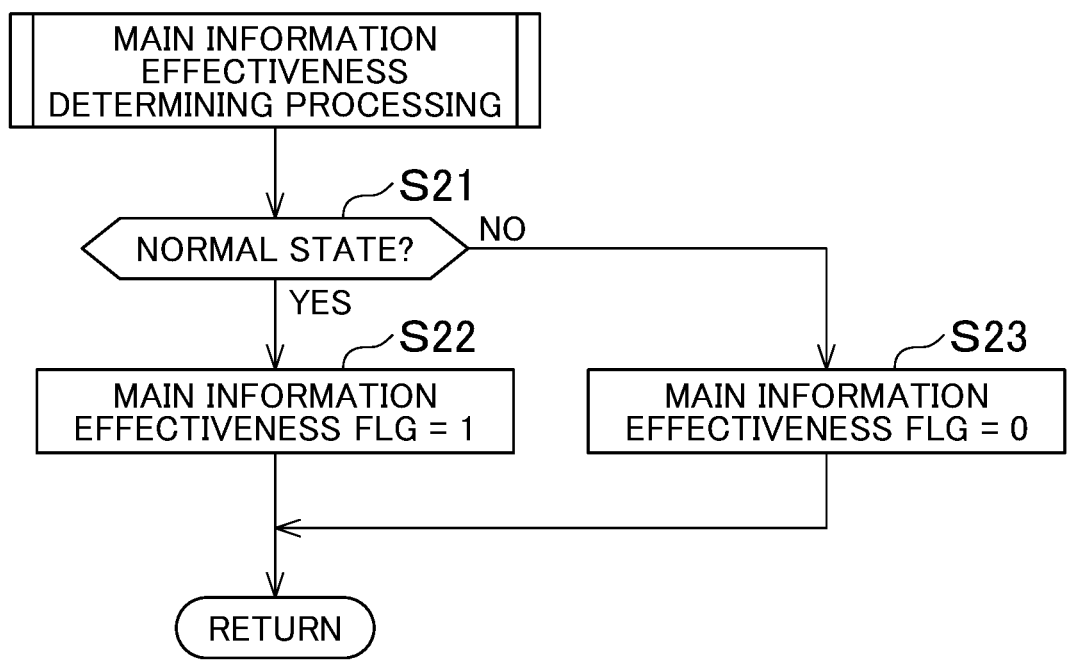
FIG. 9 is a flowchart illustrating main information effectiveness determining processing in the input value processing.

As illustrated in FIG. 9, in the main information effectiveness determining processing (Step S20), the abnormality detecting circuit 510 determines whether the main communication line C1 is in the normal state (Step S21). When the main communication line C1 is in the normal state (Step S21: YES), the abnormality detecting circuit 510 sets "1" to a main information effectiveness FLG (Step S22). Then, the abnormality detecting circuit 510 terminates the main information effectiveness determining processing, and returns to the input value processing. The main information effectiveness FLG is information indicating the communication state of the main communication line C1, and is set in a predetermined storage area of the main microcomputer 310.

When the main communication line C1 is not in the normal state (Step S21: NO), the abnormality detecting circuit 510 sets "0" to the main information effectiveness FLG (Step S23). Then, the abnormality detecting circuit 510 terminates the main information effectiveness determining processing, and returns to the input value processing.

Figure 10:
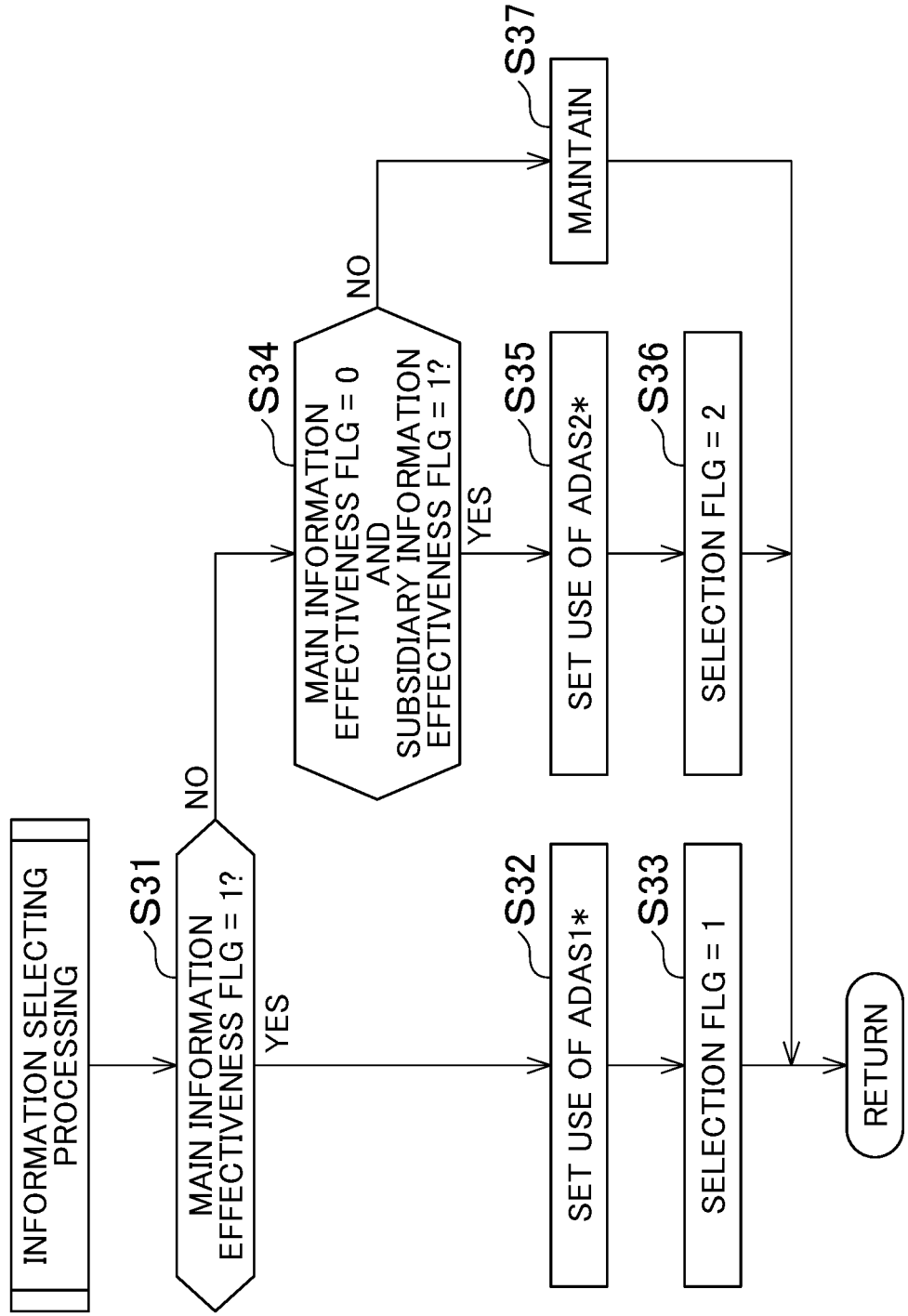
FIG. 10 is a flowchart illustrating information selecting processing in the input value processing.

As illustrated in FIG. 10, in the information selecting processing (Step S30), the abnormality detecting circuit 510 determines whether "1" is set to the main information effectiveness FLG (Step S31). When "1" is set to the main information effectiveness FLG (Step S31: YES), the abnormality detecting circuit 510 determines that the main communication line C1 is in the normal state, and sets the use of the main command value ADAS1* communicated via the main communication line C1 (Step S32). In Step S32, the abnormality detecting circuit 510 controls the selection state of the selection switching circuit 511 so that the main command value ADAS1* is output. Then, the abnormality detecting circuit 510 sets "1" to a selection FLG (Step S33). Then, the abnormality detecting circuit 510 terminates the information selecting processing, and returns to the input value processing. The selection FLG is information indicating the selection state of the selection switching circuit 511, and is set in a predetermined storage area of the main microcomputer 310. As the selection FLG, a selection FLG(N) and a selection FLG(N−1) are stored. The selection FLG(N) indicates a latest content. The selection FLG(N−1) indicates a previous content.

When "1" is not set to the main information effectiveness FLG (Step S31: NO), the abnormality detecting circuit 510 determines whether "1" is set to the subsidiary information effectiveness FLG. That is, the abnormality detecting circuit 510 determines whether "0" is set to the main information effectiveness FLG and "1" is set to the subsidiary information effectiveness FLG (Step S34). When "0" is set to the main information effectiveness FLG and "1" is set to the subsidiary information effectiveness FLG (Step S34: YES), the abnormality detecting circuit 510 determines that the main communication line C1 is not in the normal state and the subsidiary communication line C2 is in the normal state, and sets the use of the subsidiary command value ADAS2* communicated via the subsidiary communication line C2 (Step S35). In Step S35, the abnormality detecting circuit 510 controls the selection state of the selection switching circuit 511 so that the subsidiary command value ADAS2* is output. Then, the abnormality detecting circuit 510 sets "2" to the selection FLG (Step S36). Then, the abnormality detecting circuit 510 terminates the information selecting processing, and returns to the input value processing.

When "0" is set to the main information effectiveness FLG and "1" is not set to the subsidiary information effectiveness FLG (Step S34: NO), the abnormality detecting circuit 510 determines that neither the communication line C1 nor C2 is in the normal state, and maintains the setting of the use of the command value ADAS1* or ADAS2* at that time (Step S37). In Step S37, the abnormality detecting circuit 510 maintains the selection state of the selection switching circuit 511 at that time, and also maintains the content of the selection FLG. Then, the abnormality detecting circuit 510 terminates the information selecting processing, and returns to the input value processing.

Figure 11:
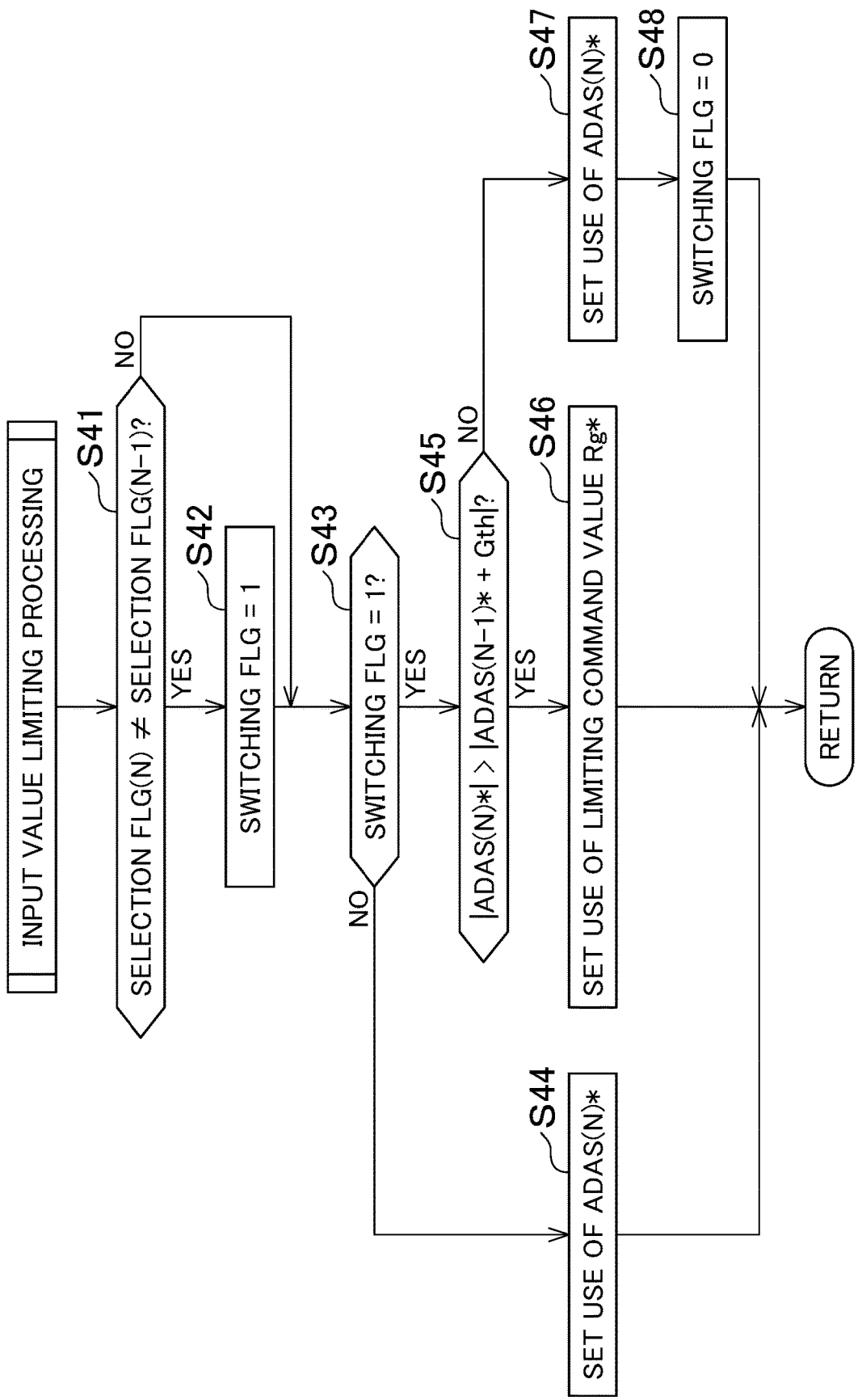
FIG. 11 is a flowchart illustrating input value limiting processing in the input value processing.

As illustrated in FIG. 11, in the input value limiting processing (Step S40), the input value limiting circuit 512 determines whether the selection FLG(N) and the selection FLG(N−1) do not match each other (Step S41). When the selection FLG(N) and the selection FLG(N−1) match each other (Step S41: NO), the input value limiting circuit 512 determines that the selection state of the selection switching circuit 511 is not switched, and proceeds to processing of Step S43.

When the selection FLG(N) and the selection FLG(N−1) do not match each other (Step S41: YES), the input value limiting circuit 512 determines that the selected command value ADAS(N)* to be used after the selection state of the selection switching circuit 511 is switched may deviate from the allowable range. Then, the input value limiting circuit 512 sets "1" to a switching FLG (Step S42), and proceeds to the processing of Step S43. The switching FLG is information indicating whether the selection state of the selection switching circuit 511 is switched and the selected command value ADAS(N)* to be used after the switching may deviate from the allowable range. The switching FLG is set in a predetermined storage area of the main microcomputer 310.

The input value limiting circuit 512 that proceeds to Step S43 from Step S41 or Step S42 determines whether "1" is set to the switching FLG. When "1" is not set to the switching FLG (Step S43: NO), the input value limiting circuit 512 sets the use of the selected command value ADAS(N)* (Step S44). In Step S44, the input value limiting circuit 512 controls the selection state of the output value switching circuit 514 so that the selected command value ADAS(N)* is output. Then, the input value limiting circuit 512 terminates the input value limiting processing, and returns to the input value processing.

When "1" is set to the switching FLG (Step S43: YES), the input value limiting circuit 512 determines whether the absolute value of the selected command value ADAS(N)* (|ADAS(N)*|) is larger than the absolute value of a value obtained by adding the switched command value ADAS(N−1)* and the limiting threshold Gth (|ADAS(N−1)*+Gth|) (Step S45). In Step S45, the change amount guarding circuit 513 of the input value limiting circuit 512 determines whether the selected command value ADAS(N)* deviates from the allowable range.

When the selected command value ADAS(N)* deviates from the allowable range (Step S45: YES), the input value limiting circuit 512 sets the use of the limiting command value Rg* (Step S46). In Step S46, the input value limiting circuit 512 controls the selection state of the output value switching circuit 514 so that the limiting command value Rg* is output. Then, the input value limiting circuit 512 terminates the input value limiting processing, and returns to the input value processing.

When the selected command value ADAS(N)* does not deviate from the allowable range (Step S45: NO), the input value limiting circuit 512 sets the use of the selected command value ADAS(N)* (Step S47). In Step S47, the input value limiting circuit 512 controls the selection state of the output value switching circuit 514 so that the selected command value ADAS(N)* is output. Then, the input value limiting circuit 512 sets "0" to the switching FLG (Step S48). Then, the input value limiting circuit 512 terminates the input value limiting processing, and returns to the input value processing. In Step S48, the input value limiting circuit 512 sets "0" to the switching FLG because the selection state of the selection switching circuit 511 is switched but the selected command value ADAS(N)* does not deviate from the allowable range.

Actions and effects of this embodiment are described below.

(1) In the information selecting processing (FIG. 10), when the main communication line C1 is in the normal state, the abnormality detecting circuit 510 sets the use of the main command value ADAS1*. When the main communication line C1 is not in the normal state, the abnormality detecting circuit 510 sets the use of the subsidiary command value ADAS2* under the condition that the subsidiary communication line C2 is in the normal state.

Therefore, the use of the main command value ADAS1* communicated via the main communication line C1 having instability in its communication state can be stopped in a stage in which the main communication line C1 is in the semi-normal state before the abnormal state is detected. In this case, detection of the normal state for the subsidiary communication line C2 is set as the condition. Therefore, the driving assistance control can be continued by using the subsidiary command value ADAS2* in place of the main command value ADAS1*. Thus, it is possible to reduce the occurrence of a situation in which the command value communicated via the communication line having instability or abnormality in its communication state is used for the driving assistance control. Accordingly, it is possible to reduce the occurrence of a situation in which the assist force cannot appropriately be applied to the steering mechanism 2 even in the situation in which the communication state of the main communication line C1 has instability.

(2) In the input value processing (FIG. 7), the abnormality detecting circuit 510 first detects the communication state of the subsidiary communication line C2, and then detects the communication state of the main communication line C1. Therefore, when the semi-normal state is detected for the main communication line C1, it is possible to reduce the occurrence of a situation in which the driving assistance control is continued by using the subsidiary command value ADAS2* in place of the main command value ADAS1* even though the subsidiary communication line C2 is not in the normal state. Accordingly, it is possible to more suitably reduce the occurrence of the situation in which the assist force cannot appropriately be applied to the steering mechanism 2 even in the situation in which the communication state of the main communication line C1 has instability.

(3) In the input value processing (FIG. 7), the abnormality detecting circuit 510 detects the communication states of the main communication line C1 and the subsidiary communication line C2 in each control period, and based on the detection results, sets the use of any one of the command values ADAS1* and ADAS2* in each control period. Therefore, when the main communication line C1 recovers to the normal state after the driving assistance control is continued by using the subsidiary command value ADAS2* because the main communication line C1 changes to a state other than the normal state, a recovery can be made such that the driving assistance control is executed by using the main command value ADAS1*.

Specifically, when the main communication line C1 recovers to the normal state after the main communication line C1 changes to a state other than the normal state, the abnormality detecting circuit 510 controls the selection state of the selection switching circuit 511 so that the main command value ADAS1* is output. That is, when the main communication line C1 is in the normal state, the abnormality detecting circuit 510 is configured to set the use of the main command value ADAS1* irrespective of whether the main communication line C1 recovers to the normal state after the main communication line C1 changes to a state other than the normal state.

When neither the communication line C1 nor C2 is in the normal state, the abnormality detecting circuit 510 maintains the selection state of the selection switching circuit 511 at that time. When the main communication line C1 recovers to the normal state, the abnormality detecting circuit 510 controls the selection state of the selection switching circuit 511 so that the main command value ADAS1* is output. That is, when the main communication line C1 is in the normal state, the abnormality detecting circuit 510 is configured to set the use of the main command value ADAS1* even if the main communication line C1 recovers to the normal state after each of the communication lines C1 and C2 changes to a state other than the normal state. Accordingly, this embodiment is effective in securing a longer period of time for the situation in which the assist force can appropriately be applied to the steering mechanism 2 in the driving assistance control.

(4) In JP 2007-153001 A described in "BACKGROUND OF THE INVENTION", the content of the identification information is switched, so that the current communication line of the backup system is switched to a communication line of an active system. Before and after the switching, however, the value of the information for controlling the driving of the motor may deviate unexpectedly. That is, when the communication line of the backup system is switched to a communication line of an active system, the value of the information for controlling the driving of the motor may change abruptly before and after the switching. Thus, there is a situation in which the power cannot appropriately be applied to the steering mechanism.

In view of the above, in the input value limiting processing (FIG. 11), when the selected command value ADAS(N)* deviates from the allowable range after the selection state of the selection switching circuit 511 is switched, the input value limiting circuit 512 sets the use of the limiting command value Rg*.

Therefore, even when the selection state of the selection switching circuit 511 is switched and the selected command value ADAS(N)* to be used after the switching deviates unexpectedly, the deviation is suppressed by setting the use of the limiting command value Rg*. Thus, it is possible to reduce influence of the switching of the selection state of the selection switching circuit 511 on the driving assistance control. Accordingly, it is possible to reduce the occurrence of a situation in which the assist force cannot appropriately be applied to the steering mechanism 2 even after the selection state of the selection switching circuit 511 is switched.

(5) The allowable range is based on the switched command value ADAS(N−1)* and is set by the limiting threshold Gth that defines its relationship in accordance with the vehicle speed V of the vehicle A after the selection state of the selection switching circuit 511 is switched.

Therefore, when the selection state of the selection switching circuit 511 is switched and the selected command value ADAS(N)* to be used after the switching deviates unexpectedly, it is possible to use the limiting command value Rg* that is optimized in accordance with the traveling state of the vehicle A at that time, that is, the vehicle speed V of the vehicle A. Accordingly, it is possible to more suitably reduce the occurrence of the situation in which the assist force cannot appropriately be applied to the steering mechanism 2 even after the selection state of the selection switching circuit 511 is switched.

(6) In the input value limiting processing (FIG. 11), when the selection state of the selection switching circuit 511 is switched and then the selected command value ADAS(N)* does not deviate from the allowable range during a period in which the driving assistance control is continued by using the limiting command value Rg*, the input value limiting circuit 512 sets the use of the selected command value ADAS(N)*.

Therefore, it is possible to suppress protraction of a situation in which the use of the limiting command value Rg* is set even after the selection state of the selection switching circuit 511 is switched. Thus, it is possible to promptly recover to the state in which the driving assistance control is executed by using the command value ADAS1* or ADAS2* even after the selection state of the selection switching circuit 511 is switched.

The embodiment described above may be modified as appropriate and implemented as in the following modified embodiments. The steering ECU 30 may include the main microcomputer 310 alone. In the steering ECU 30, the main communication line C1 may be connected to the main microcomputer 310 alone, and the subsidiary communication line C2 may be connected to the subsidiary microcomputer 320 alone. In this case, it is only necessary that the communication states of the communication lines respectively connected to the microcomputers 310 and 320 be communicable between the microcomputers 310 and 320. In this case, the selection state of the selection switching circuit 511 and the switching between the microcomputers 310 and 320 for the master processing circuit and the slave processing circuit may be associated with each other. For example, it is only necessary that the microcomputer to which the communication line to be used for the driving assistance control is connected be set as the master processing circuit and the other microcomputer be set as the slave processing circuit.

Instead of providing the input value processing circuits 411 and 421 in the microcomputers 310 and 320, respectively, a computation circuit such as an application-specific integrated circuit (ASIC) having the functions of the input value processing circuits 411 and 421 may be provided separately from the microcomputers 310 and 320. In this case, individual computation circuits may be provided for the microcomputers 310 and 320, or a single common computation circuit may be provided for the microcomputers 310 and 320.

In the input value processing, the subsidiary information effectiveness determining processing, the main information effectiveness determining processing, and the information selecting processing need not be executed after the selection state of the selection switching circuit 511 is switched so that the subsidiary command value ADAS2* is output through the processing of Step S35 of the information selecting processing.

The order of execution of the subsidiary information effectiveness determining processing and the main information effectiveness determining processing may be set reversely. It is only necessary that the information selecting processing be executed after the subsidiary information effectiveness determining processing and the main information effectiveness determining processing are executed in the same control period of the microcomputers 310 and 320.

Once "1" is set to the switching FLG, the switching FLG in this state may be continued unless a special condition such as a reset of communication is satisfied.

The map that defines the limiting threshold Gth may define a relationship between the limiting threshold Gth and a rotation angle of the column shaft 11a and steering angles of the steered wheels 15, that is, an actual angle $\theta s$, a steering angle velocity $\omega$ indicating a change amount of the actual angle $\theta s$, or the current values I1 and I2 of the motor 20 instead of the vehicle speed V. The map may also define a relationship between the limiting threshold Gth and any one of those factors or a combination of those factors and the vehicle speed V.

The limiting threshold Gth may be a value that is set in advance irrespective of the traveling state of the vehicle A, that is, the vehicle speed V. Other methods are applicable as long as the limiting command value Rg* is generated as a value that falls within the allowable range used in Step S45 of the input value limiting processing.

Regarding the communication state, it is only necessary to determine that a reception failure occurs in the main communication line C1 at least in the case where the main command value ADAS1* cannot be received at an appropriate timing, or the case where the main command value ADAS1* can be received at an appropriate timing but the checksum indicates an abnormality in its value. The same applies to the communication state of the subsidiary communication line C2.

Regarding the communication state, it may be determined whether a failure in the reception of the main command value ADAS1* occurs in the main communication line C1 by detecting various voltages such as an operation voltage for the operation of the main microcomputer 310. The same applies to the communication state of the subsidiary communication line C2.

Regarding the communication state, it may be detected that the communication state is abnormal when the reception failure count Er is equal to or larger than a second threshold count that is larger than the threshold count Eth. The main communication line C1 and the subsidiary communication line C2 may be changed so as to use a communication scheme such as CAN with Flexible Data Rate (CAN FD) or FlexRay (registered trademark). Three lines may be used by adding a subsidiary communication line C3 having a function similar to that of the subsidiary communication line C2 in addition to the communication lines C1 and C2. Further, four or more lines may be used by adding subsidiary communication lines having similar functions.

In the embodiment described above, each of the command values ADAS1* and ADAS2* may be implemented by, for example, an angle command value indicating an angle of the vehicle A relative to a road, or a torque command value indicating a torque for turning the steered wheels 15 so as to achieve the angle of the vehicle A relative to the road. When the angle command value is used as each of the command values ADAS1* and ADAS2*, the ADAS controlled-variable setting circuits 412 and 422 only need to calculate the rotation angle of the column shaft 11a and the steering angles of the steered wheels 15, that is, the actual angle $\theta s$ by processing the rotation angles $\theta m1$ and $\theta m2$, and to set the controlled variables based on the actual angle $\theta s$. When the torque command value is used as each of the command values ADAS1* and ADAS2*, the ADAS controlled-variable setting circuits 412 and 422 only need to set the torque command values directly as the controlled variables.

The driving assistance control may assist the user's driving by a method different from the method of following the target course. For example, the driving assistance control may be implemented by automatic braking assistance control for automatically applying a brake, or by sideslip preventing control (vehicle stability control).

When the assist controlled variable TA* is set, the use of the steering torque Tr1 or Tr2 is at least required, and the use of the vehicle speed V is not necessarily required. When the assist controlled variable TA* is set, other factors may be used in addition to the steering torque Tr1 or Tr2 and the vehicle speed V. When the ADAS controlled variable TB* is set, the use of the command value ADAS1* or ADAS2* is at least required. The vehicle speed V and other factors may be used in addition to the command value ADAS1* or ADAS2*.

The embodiment described above is applied to the electric power steering system 1 of the type in which the power is applied to the column shaft 11a, but may be applied to an electric power steering system of a type in which the power is applied to the rack shaft 12. In this case, the torque sensors 40a and 40b may be provided on, for example, the pinion shaft 11c.

The embodiment described above is also applicable to, for example, a steer-by-wire type steering system. In this case, it is only necessary that the actuator 3 drive the rack shaft 12 as a drive unit provided on the periphery of the rack shaft 12. The modified examples may be applied in combination. For example, the embodiment applied to the steer-by-wire type steering system and the configurations of the other modified examples may be applied in combination.

What is claimed is:

1. A steering control apparatus for use with a motor that is a source of power for turning a steered wheel of a vehicle such that the power is applied to a steering mechanism through the motor, the steering control apparatus comprising:

control processing circuits configured to control driving of the motor so that the power for turning the steered wheel is applied to the steering mechanism;

a plurality of communication lines for communicating control information to the control processing circuits for controlling the driving of the motor, the plurality of communication lines being connected to each of the control processing circuits, the plurality of communication lines including:

a main communication line for communicating the control information to the control processing circuits, and a subsidiary communication line for communicating the control information to the control processing circuits, and an abnormality detecting circuit configured to:

detect, as a communication state of each of the plurality of communication lines, (i) a normal state in which the control information is communicable, (ii) a semi-normal state detected during the normal state, the semi-normal state being a state in which an abnormality occurs but the control information is communicable through the main communication line, or (iii) an abnormal state detected during the semi-normal state, the abnormal state being a state in which an abnormality occurs and the control information is not communicable through the main communication line;

when the normal state is detected for the main communication line, set use of communicating the control information via the main communication line; and when the semi-normal state or the abnormal state is detected for the main communication line, set use of communicating the control information via the subsidiary communication line under a condition that the normal state is detected for the subsidiary communication line.

2. The steering control apparatus according to claim 1, wherein the abnormality detecting circuit is configured to first detect the communication state of the subsidiary communication line, and then detect the communication state of the main communication line.

3. The steering control apparatus according to claim 1, wherein the abnormality detecting circuit is configured to:
  detect the communication states of the main communication line and the subsidiary communication line in control periods defined in advance, and
  set use of any one of the main control information and the subsidiary control information in the each control period.

* * * * *